(12) United States Patent
Tian et al.

(10) Patent No.: US 6,714,683 B1
(45) Date of Patent: Mar. 30, 2004

(54) WAVELET BASED FEATURE MODULATION WATERMARKS AND RELATED APPLICATIONS

(75) Inventors: Jun Tian, Tualatin, OR (US); Stephen K. Decker, Lake Oswego, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/645,779

(22) Filed: Aug. 24, 2000

(51) Int. Cl.⁷ ................................. G06R 9/00
(52) U.S. Cl. .................. 382/240; 713/176; 382/100
(58) Field of Search ................. 382/100, 240; 375/130; 713/176; 380/210, 51; 702/191; 707/100

(56) References Cited

U.S. PATENT DOCUMENTS

| | | | |
|---|---|---|---|
| 5,617,119 A | | 4/1997 | Briggs et al. |
| 5,636,292 A | | 6/1997 | Rhoads |
| 5,646,997 A | * | 7/1997 | Barton ................... 713/176 |
| 5,721,788 A | * | 2/1998 | Powell et al. ............... 382/100 |
| 5,825,892 A | | 10/1998 | Braudaway et al. |
| 5,835,639 A | | 11/1998 | Honsinger et al. |
| 5,841,886 A | | 11/1998 | Rhoads |
| 5,859,788 A | * | 1/1999 | Hou ........................ 708/400 |
| 5,862,260 A | | 1/1999 | Rhoads |
| 5,933,798 A | | 8/1999 | Linnartz |
| 5,974,548 A | | 10/1999 | Adams |
| 6,005,936 A | | 12/1999 | Shimizu et al. ................. 380/4 |
| 6,064,764 A | | 5/2000 | Bhaskaran et al. |
| 6,065,119 A | | 5/2000 | Sandford, II et al. |
| 6,101,602 A | | 8/2000 | Fridrich ................... 713/176 |
| 6,122,403 A | | 9/2000 | Rhoads |
| 6,173,079 B1 | * | 1/2001 | Hwang .................... 382/239 |
| 6,226,387 B1 | | 5/2001 | Tewfik et al. |
| 6,240,121 B1 | * | 5/2001 | Senoh ..................... 375/130 |
| 6,246,777 B1 | | 6/2001 | Agarwal et al. |
| 6,272,634 B1 | * | 8/2001 | Tewfik et al. ................ 713/176 |
| 6,275,599 B1 | | 8/2001 | Adler et al. |
| 6,285,775 B1 | | 9/2001 | Wu et al. |
| 6,332,030 B1 | | 12/2001 | Manjunath et al. |
| 6,332,031 B1 | | 12/2001 | Rhoads et al. |
| 6,332,194 B1 | * | 12/2001 | Bloom et al. ............... 713/176 |
| 6,359,998 B1 | * | 3/2002 | Cooklev .................... 382/100 |
| 6,385,329 B1 | * | 5/2002 | Sharma et al. .............. 382/100 |

FOREIGN PATENT DOCUMENTS

| | | |
|---|---|---|
| EP | 0891071 | 1/1999 |
| EP | 0953938 | 11/1999 |
| WO | WO00/33282 | 6/2000 |
| WO | WO00/75925 | 12/2000 |

OTHER PUBLICATIONS

Kundur et al., "Digital Watermarking Using Multiresolution Wavelet Decomposition," Proc. of 1998 IEEE Int. Conf. on Acoustics, Speech and Signal Processing, ICASSP '98, pp. 2969–2972, vol. 5.

(List continued on next page.)

*Primary Examiner*—Jayanti K. Patel
*Assistant Examiner*—Barry Choobin
(74) *Attorney, Agent, or Firm*—Joel R. Meyer; Digimarc Corporation (57) ABSTRACT

A watermark embedder decomposes a media signal from its perceptual domain to subbands and embeds a message signal in the edge information of neighboring coefficients of those subbands. A compatible watermark decoder decomposes the watermarked signal into subbands and demodulates the message signal from the edge information of neighboring coefficients. In addition to the message signal, the embedder may also encode an orientation signal to synchronize the decoder with the embedded signal in a distorted version of the watermarked signal. The watermark system may be used in a variety of applications, including robustly carrying metadata or links to metadata, and to detect alterations of the watermarked signal, such as alterations due to printing, scanning, compression, etc.

28 Claims, 3 Drawing Sheets

OTHER PUBLICATIONS

Matsui et al., "Embedding a Signature to Pictures Under Wavelet Transformation," *Transactions of the Institute of Electronics Information and Communication Engineers D–II*, vol. J79D–II, No. 6, Jun., 1996, pp. 1017–1024.

Matsui et al., "Use of the Wavelet Transformation to Embed Signatures in Images," Systems and Computers in Japan, Jan., 1997, vol. 28, No. 1, pp. 87–94.

Meerwald et al., "A Survey of Wavelet–domain Watermarking Algorithms", *Security and Watermarking of Multimedia Contents III*, Jan. 2001, vol. 4314, pp. 505–516.

Onishi et al., "A Method of Watermarking with Multiresolution Analysis and Pseudo Noise Sequences," Systems and Computers in Japan, vol. 29, No. 5, pp. 11–19, May 1998.

Ohnishi et al., Embedding a Seal into a Picture Under Orthogonal Wavelet Transform, Proceedings of Multimedia '96, 1996, IEEE, pp. 514–521.

Pereira et al., "Optimized Wavelet Domain Watermark Embedding Strategy Using Linear Programming", SPIE AeroSense 2000: Wavelet Applications, Apr. 2000.

Swanson et al., "Multiresolution Scene–Based Video Watermarking Using Perceptual Models," IEEE Journal of Selected Areas in Communications, May, 1998, vol. 16, No. 4, pp. 540–550.

Swanson et al., "Multiresolution Video Watermarking Using Perceptual Models and Scene Segmentation," Proc. Int. Conf. on Image Processing, vol. 2, pp. 558–561, Oct. 1997.

Tsekeridou et al., "Embedding self–similar watermarks in the wavelet domain," Proceeding of the IEEE ICASSP 2000, Jun. 2000, pp. 1967–1970.

Tsekeridou et al., "Wavelet–Based Self–Similar Watermarking for Still Images", 2000 IEEE International Symposium on Circuits and Systems. Emerging Technologies for the $21^{st}$ Century, pp. 220–223.

Wang et al., "Wavelet Based Digital Image Watermakring," Optics Express, vol. 3, No. 12, pp. 491–496, Dec. 7, 1998.

Wei et al., "Perceptual Digital Watermark of Images Using Wavelet Transform," IEEE Transactions on Consumer Electronics, vol. 44, No. 4, pp. 1267–1272, Nov. 1998.

Xie et al., "Joint Wavelet Compression and Authentication Watermarking", ICIP, Oct. 4–7, 1998, pp. 427–431.

Zhu et al., "Multiresolution Watermarking for Images and Video", IEEE Transactions on Circuits and Systems for Video Technology, vol. 9, No. 4, Jun. 1999, pp. 545–550.

Chae et al., "A Robust Embedded Data from Wavelet Coefficients", Department of Electrical and Computer Engineering, University of California.

Cooklev et al., "A Multiresolution Technique for Watermarking Digital Images", ICCE, Jun. 11–13, 1997, pp. 354–355.

Dugad et al., "A New Wavelet–Based Scheme for Watermarking Images", IEEE, Oct. 4–7, 1998, pp. 419–423.

Hsu et al., "Multiresolution Watermarking for Digital Images," IEEE Trans. on Circuits and Systems II: Analog and Digital Signal Processing, vol. 45, No. 8, pp. 1097–1101, Aug., 1998.

Inoue et al., "A Digital Watermark Method Using the Wavelet Transform for Video Data", IEICE Trans. Fundamentals, Vol. E83–A, No. 1, Jan. 2000, pp. 96.

Kim et al., "A Robus Wavelet–Based Digital Watermarking Using Level–Adaptive Thresholding", IEEE 1999, pp. 226–230.

Kim et al., "Wavelet Based Watermarking Method for Digital Images Using the Human Visual System", IEEE 1999, pp. 80–83.

Kundur et al., "A Robust Digital Image Watermarking Method Using Wavelet–Based Fusion," Int. Conf. on Image Proc., Oct. 1997, pp. 544–547.

Kundur et al., "Digital Watermarking for Telltale Tamper Proofing and Authentication", IEEE, vol. 87, No. 7, pp. 1167–1180.

Larry, P. et al., "Content–Based Watermarking for Image Authentication," *Proc. $3^{rd}$ Int. Workshop on Information Hiding*, Sep./Oct. 1999, pp. 187–198.

Queluz, M.P. et al., "Spatial Watermark for Image Verification," *Proc. SPIE vol. 3971: Security and Watermarking of Multimedia Contents II*, Jan. 2000, pp. 120–130.

Sun. Q. et al., "VQ–Based Digital Signature Scheme for Multimedia Content Authentication," *Proc. SPIE vol. 3971: Security and Watermarking of Multimedia Contents II*, Jan. 2000, pp. 404–416.

Xie, L. et al. "Methods for Soft Image/Video Authentication," *Proc. Conf. of ATIRP (Advanced Telecommunications and Information Distribution Research Project)*, Mar. 2000, 5 pages.

Rey, C. et al., "Blind Detection of Malicious Alterations on Still Images Using Robust Watermarks," *Proc. II Seminar on Secure Images and Image Authentication*, Apr. 2000, pp. 7/1–7/6.

Bassali et al., "Compression Tolerant Watermarking for Image Verification," IBM India Researcch Lab, date unknown, 4 pages.

Frequently Asked Questions, EPSON Image Authentication System (IAS), Oct. 5, 1999, 3 pages.

Szepanski, W., "A Signal Theoretic Method for Creating Forgery–Proof Documents of Automatic Verification," *IEEE Proc 1979 Carnahan Conf. con Crime Countermeasures*, May 1979, pp. 101–109.

Matthews, R., "When Seeing is not Believing," *New Scientist*, No. 1895, Oct. 16, 1993, pp. 13–15.

Friedman, G.L., "The Trustworthy Digital Camera; Restoring Credibility to the Photographic Image," *IEEE Trans. Consumer Electronics,*, vol. 39, No. 4, Nov. 1993, pp. 905–910.

Walton, S., "Image Authentication for a Slippery New Age," *Dr. Dobb's Journal*, Apr. 1995, pp. 18–20, 22, 24, 26, 82 and 84–87.

Schneider, Mr., "A Robust Content Based Digital Signature for Image Authentication," *IEEE Proc. Int. Conf. on Image Processing*, Sep. 1996, pp. 227–230 (vol. 3).

Lin, C.–Y. et al., "Generating Robust Digital Signature for Image/Video Authentication," *Proc. Multimedia and Security Workshop at ACM Multimedia '98*, Sep. 1998, pp. 49–54.

Dittman, J., "Chapter 3: Telltale Watermarking," in *Multiresolution Digital Watermarking: Algorithms and Implications for Multimedia Signals*, Ph.D. thesis at Univ. of Toronto, 1999, pp. 23–52.

Lin, C.–Y. et al., "Issues and Solutions for Authenticating MPEG Video," *Proc. SPIE vol. 3657: Security and Watermarking of Multimedia Contents*, Jan. 1999, pp. 54–65.

Xie, L. et al., "Secure MPEG Video Communications by Watermarking," *Proc. Conf. of ATIRP (Advanced Telecommunications and Information Distributions Research Project)*, Feb. 199, pp. 459–462.

Dittmann, J. et al., "Content–Based Digital Signature for Motion Pictures Authentication and Content–Fragile Watermarking," *IEEE Proc. Int. Conf. on Multimedia Computing and Systems,* Jun. 1999, pp. 209–213.

U.S. Patent Application No. 60/180,364 filed Feb. 2, 2000, Davis et al.

U.S. Patent Application No. 60/198,138 filed Apr. 17, 2000, Alattar.

U.S. Patent Application No. 60/198,857 filed Apr. 21, 2000, Davis et al.

U.S. Patent Application No. 09/198,022 filed Nov. 23, 1998, Rhoads.

U.S. Patent Application No. 09/525,865 filed Mar. 15, 2000, Davis et al.

U.S. Patent Application No. 09/625,577 filed Jul. 25, 2000, Carr et al.

* cited by examiner

WAVELET BASED FEATURE MODULATION WATERMARKS AND RELATED APPLICATIONS

RELATED APPLICATION DATA

The subject matter of the present application is related to that disclosed in U.S. Pat. No. 5,862,260, and in application Ser. No. 09/503,881, filed Feb. 14, 2000; which are hereby incorporated by reference.

TECHNICAL FIELD

The invention relates to steganography, and in particular relates to hiding data in media objects such as images, video and audio.

BACKGROUND AND SUMMARY

Steganography refers to a process of hiding information in other information. One form of steganography is digital watermarking. Digital watermarking is a process for modifying media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting), software, multi-dimensional graphics models, and surface textures of objects.

Digital watermarking systems have two primary components: an embedding component that embeds the watermark in the media content, and a reading component that detects and reads the embedded watermark. The embedding component embeds a watermark by altering data samples of the media content in the spatial, temporal or some other transform domain (e.g., Fourier, Discrete Cosine, Wavelet Transform domains). The reading component analyzes target content to detect whether a watermark is present. In applications where the watermark encodes information (e.g., a message), the reader extracts this information from the detected watermark.

The present assignee's work in steganography, data hiding and watermarking is reflected in U.S. Pat. No. 5,862,260; in application Ser. No. 09/503,881 and now U.S. Pat. No. 6,408,082; and in published specifications WO 9953428 and WO0007356 (corresponding to U.S. Pat. Nos. 6,449,377 and 6,345,104). A great many other approaches are familiar to those skilled in the art. The artisan is presumed to be familiar with the full range of literature about steganography, data hiding and watermarking.

The invention provides a wavelet based, feature modulation watermark system and methods. In addition, it provides a variety of fragile and semi-fragile watermark systems and methods that may be used to detect alteration or copying of watermarked signals or physical objects.

One aspect of the invention is a watermark embedder. The watermark embedder decomposes a media signal from its perceptual domain to subbands and embeds a message signal in the edge information of neighboring coefficients of those subbands.

Another aspect of the invention is a watermark decoder. The watermark decoder decomposes the watermarked signal into subbands and demodulates the message signal from the edge information of neighboring coefficients.

This document describes a variety of implementation details and applications of watermark embedders and decoders. In addition to the message signal, for example, the embedder may also encode an orientation signal to synchronize the decoder with the embedded signal in a distorted version of the watermarked signal.

The watermark system may be used in a variety of applications, including robustly carrying metadata or links to metadata, and to detect alterations of the watermarked signal, such as alterations due to printing, scanning, compression, etc. The watermark may be used to detect alteration by evaluating changes to instances of a message signal decoded from a host media signal. In one application for example, a watermark decoder evaluates changes in a watermark message signal relative to a reference message signal. The reference may be the original message signal embedded in the host media signal, instances of the message signal decoded from different parts of the media signal (e.g., different subbands), or a combination of both. In addition, the watermark may be used to carry authentication information, such as a hash of the host signal, that is used to detect alteration. The watermark decoder compares the hash extracted from the watermark with a hash re-computed from the host signal to detect alteration. The decoder may also use the extent and nature of the detected alteration to distinguish among different types of alterations, such as those due to printing, scanning, compression, etc.

Further features will become apparent with reference to the following detailed description and accompanying drawings.

DETAILED DESCRIPTION

Introduction

The following sections describe wavelet based watermark technologies. The first section describes an embedding function for encoding auxiliary information in the wavelet domain of a media object, such as image signal. The next section describes a compatible watermark decoding function. Subsequent sections describe extensions and applications of these wavelet based watermark encoding and decoding functions.

Watermark Encoding

Figure 1:
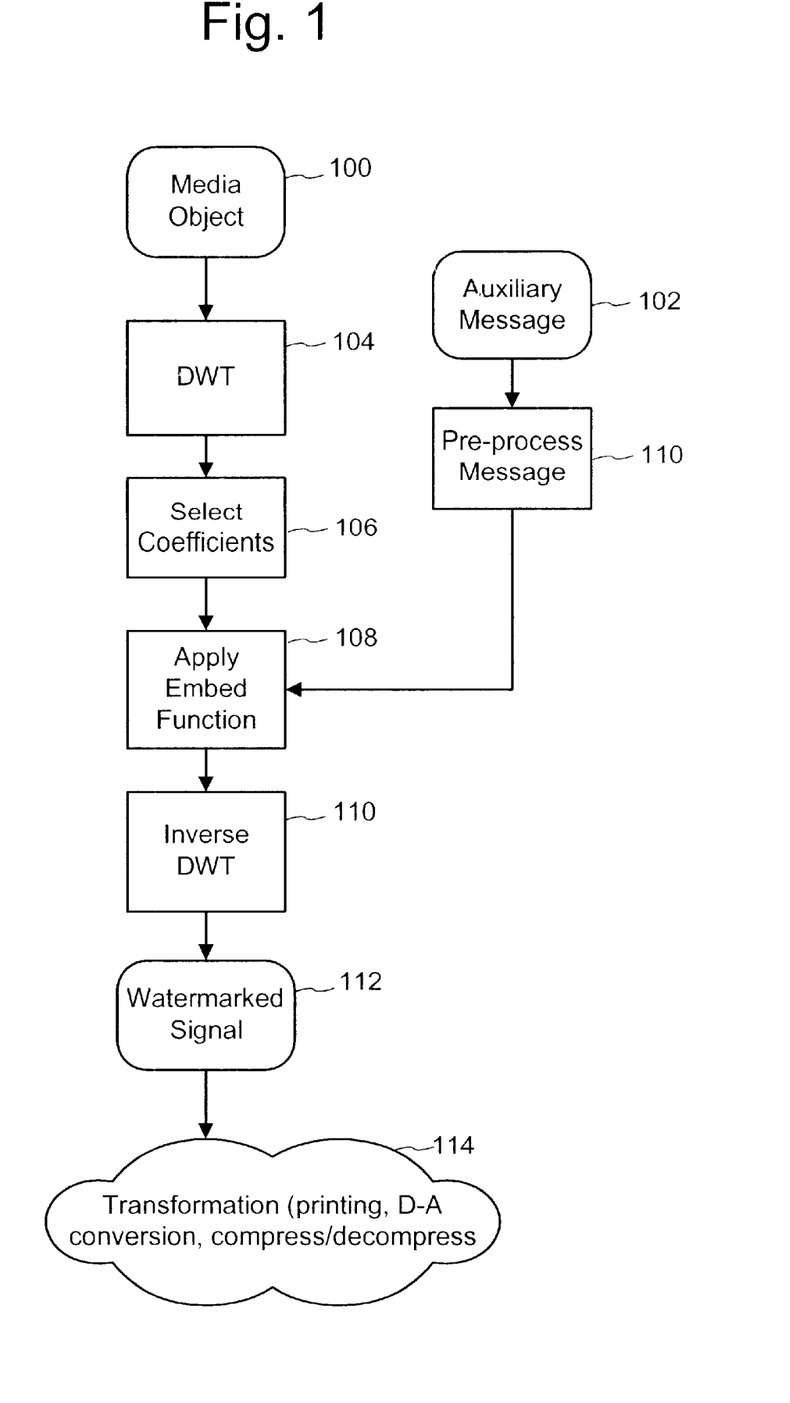
FIG. 1 is a flow diagram illustrating a wavelet based watermark encoding method.

FIG. 1 is a flow diagram illustrating a wavelet based watermark encoding method. The inputs to the encoder include a media object 100, such as a two-dimensional image, and an auxiliary message 102 to be hidden in the object. This method applies to a variety of media types (e.g., audio, video, etc.), but for the sake of illustration, is described for the case of an image signal. The image signal is a two dimensional array of sample values. For this implementation, the watermark is embedded in the luminance channel, but may be embedded in other color channels as well.

Figure 2:
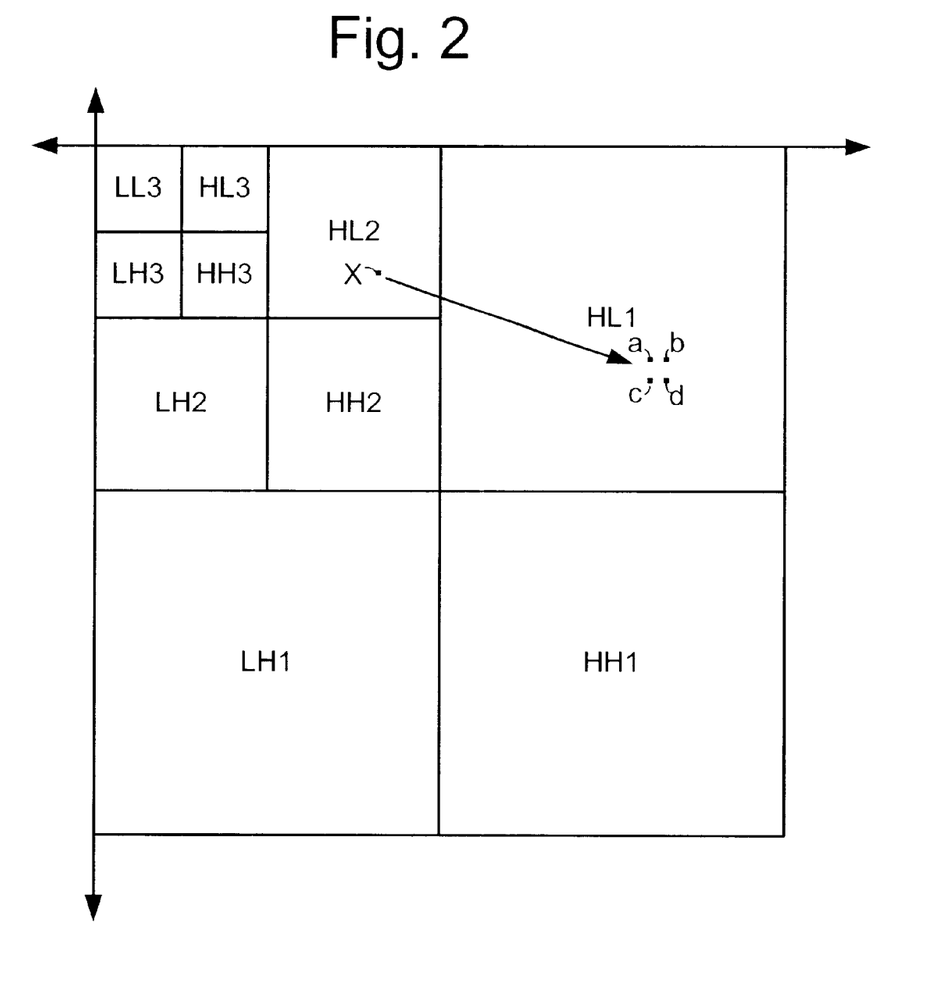
FIG. 2 illustrates an example of a decomposition of a two dimensional signal into subbands.

The encoder begins by computing a discrete wavelet transform of the image (104). The wavelet transform decomposes the image signal into multiple levels of resolution. There are several types of wavelet transforms that may be selected for a particular implementation, such as orthogonal (like Haar, Daubechies), biorthogonal, multiwavelet, wavelet packet, and smooth wavelets (like Symlet, Morlet, Mexican Hat, and Meyer). A current implementation of the method depicted in FIG. 1 employs a Cohen-Daubechies-Feauveau 7/9 taps biorthogonal discrete wavelet transform, but other types of wavelet transforms may be used as well. FIG. 2 shows an example of a wavelet transform of a two-dimensional signal such as a still image. This example has three levels of decomposition. The highest to the lowest levels of resolution are numbered from 1 to 3, and LL3 is a low resolution version of the original image (referred to as the approximate band). Beside the lowest level, LL3, each of the other levels includes three bands (also referred to as "subbands"): HL representing coefficients of signals oriented in the vertical direction, LH representing coefficients or signals oriented in the horizontal direction, and HH representing coefficients of signals oriented in the diagonal direction.

After transforming the image, the encoder may optionally evaluate coefficients to select a subset for embedding elements of an auxiliary message (106). Alternatively, the encoder may simply select all coefficients in certain bands for encoding the auxiliary message. Each discrete element of a binary message signal is mapped to a group of wavelet coefficients. In this implementation for example, each element maps to four coefficients in a given band. One way to select the coefficients is to define an ordering of the wavelet coefficients, select the N largest magnitude coefficients of a particular band, and then modify children coefficients of each of the N coefficients. To illustrate the concept of children coefficients, FIG. 2 shows an example of a parent coefficient X in a subband (HL2), and corresponding four children a, b, c, d at the same relative spatial location in the next, higher resolution level (HL1) in the wavelet decomposition.

In this particular encoder, the auxiliary message signal is a binary-valued signal, comprising a sequence of values of $\{1, -1\}$. The sequence is represented as $S=(S_1, S_2, \ldots, S_M)$, where M is the message length.

The encoder embeds elements of the message sequence into corresponding coefficients by applying an embedding function to these coefficients (108). Specifically, the embedding function encodes an element of the message by modulating edge information represented in neighboring coefficients. In particular, each message element may be encoded by modulating the relative values of neighboring coefficients in a given subband, taking into account the direction of the edges in that subband.

An example of this type of edge feature embedding function is as follows:

1. If the coefficients a, b, c, d reside in a HL subband, then the encoder modifies the children such that:

$$||a|-|c||-||b|-|d||=s_i W_i$$

where $w_i$ is the watermark strength.

2. If the coefficients a, b, c, d reside in a LH subband, then the encoder modifies the children such that:

$$||a|-|b||-||c|-|d||=s_i w_i$$

where $w_i$ is the watermark strength.

3. If the coefficients a, b, c, d reside in a HH subband, then the encoder modifies the children such that:

$$||a|-|d||-||b|-|c||=s_i w_i$$

where $w_i$ is the watermark strength.

HL, LH and HH subbands represent vertical, horizontal, and diagonal edge information, respectively. The above embedding function exploits this edge information by modulating the differences of neighboring coefficients in the direction of the edges in the subband.

As an alternative to embedding a message in coefficients selected by magnitude, the encoder may encode the message in groups of coefficients that encompass all of the samples in a given subband or set of subbands. For example, each two by two block of samples in a subband or selected subbands may be used to encode an element of the binary message signal. In one alternative implementation, for example, the encoder embeds a message signal in the LH3, and HL3 subbands. In this implementation, the encoder subdivides the entire LH3 and HL3 subbands into contiguous two by two blocks of coefficients and then applies the embedding function described above to encode a message signal.

In some applications, the number of elements in the message signal is less than the number of groups of coefficients that each encode a single element of the message signal. In such cases, the message (or portions of it) can be repeated and then embedded using all of the available coefficients in the selected bands for carrying the message.

Another variation of the above encoding method is to sub-divide the host signal into segments and then encode a watermark signal in each segment. For example, in one implementation for images, the encoder sub-divides the image into N by N blocks, and then performs a DWT process, coefficient selection and embedding function on each block. Level 1 has N/2 by N/2 coefficient samples in each subband, Level 2 has N/4 by N/4 coefficients in each subband, etc. Since there are three subbands per level in the wavelet decomposed image, a message of length M can be repeated in each level the following number of times:

$$\frac{(N)^2 \times 3}{4^{L+1} M},$$

where L is the level of resolution and each element of the watermark message is encoded in a two by two block of coefficients as described above.

Referring again to FIG. 1, the encoder may perform one or more pre-processing operations (110) on an auxiliary message to place it in a form for embedding into the host signal. Some examples of pre-processing steps include: appending control symbols (e.g., a known message string that may be used to verify that a valid message is present and to synchronize or calibrate a watermark decoder with the embedded message string); adding error detection symbols; performing error correction encoding (BCH, Reed Solomon, Convolution codes), spread spectrum modulation (e.g., repeating the message and spreading it over a pseudorandom sequence using a spreading function such as XOR or multiplication), and other symbol encoding processes (M sequences, gold sequences, etc.). The result of these pre-processing operations may be expressed in a binary form as noted above.

After applying the embedding function to embed the message signal, the encoder performs an inverse DWT (110) on the decomposed signal to generate a watermarked signal 112.

At this stage, the watermarked signal is perceptually similar to the original, un-watermarked original media object. The degree of imperceptibility of the watermark may be increased at the expense of watermark signal strength and/or message capacity. After being watermarked, the media object may be subjected to various transformations (114) as a result of malicious attack or routine processing such as digital to analog—analog to digital conversion (e.g., printing, display, playback, image capture, audio signal sampling, etc.), compression/decompression, geometric distortion, up sampling, down sampling, subsequent watermarking, time scale modifications (for temporal signals), etc. As detailed further below, the watermark may be designed to withstand certain types of transformations. In some cases, the watermark may be designed to degrade in predictable ways in response to certain types of transformations, such as scanning, printing or compression so that such transformations can be detected.

In some applications, the watermarked signal may be subjected to various types of distortion, including geometric transformation. As such, it is useful to incorporate features into the watermark that enable the decoder to detect the watermark in a signal suspected of containing a watermark and to determine its orientation parameters, such as its origin (translation), rotation, scale, affine transform parameters, shear, differential scale, etc. One such feature is a watermark synchronization signal or orientation signal. One example is an orientation signal that is expressed as a collection of impulse or "delta" functions in the Fourier magnitude domain having pseudorandom phase. Various forms of correlation operations may be used to detect the orientation signal and determine its orientation parameters as disclosed in U.S. Pat. No. 5,862,260, and in application Ser. No. 09/503,881, filed Feb. 14, 2000; which is incorporated by reference. For example, a decoder may correlate a reference orientation signal with a signal suspected of containing a watermark. The amount of correlation can be used to determine whether the watermark is likely present. The resulting orientation parameters may be used to align the watermarked signal to approximate the geometric position of the signal at the time of encoding. Then, the decoder may extract the auxiliary message from the re-aligned signal data.

In one implementation, for example, the encoder subdivides an image into blocks and uses the above encoding method to embed an auxiliary message in selected subbands. The encoder then adds an orientation signal to each block. In particular, the encoder adds the spatial domain image signal representing the watermark orientation signal to the image block after embedding the message signal to it. To reduce the visibility of the orientation signal, the encoder may apply a perceptual mask to the watermark orientation signal before adding it to the watermarked image block.

Watermark Decoding

Figure 3:
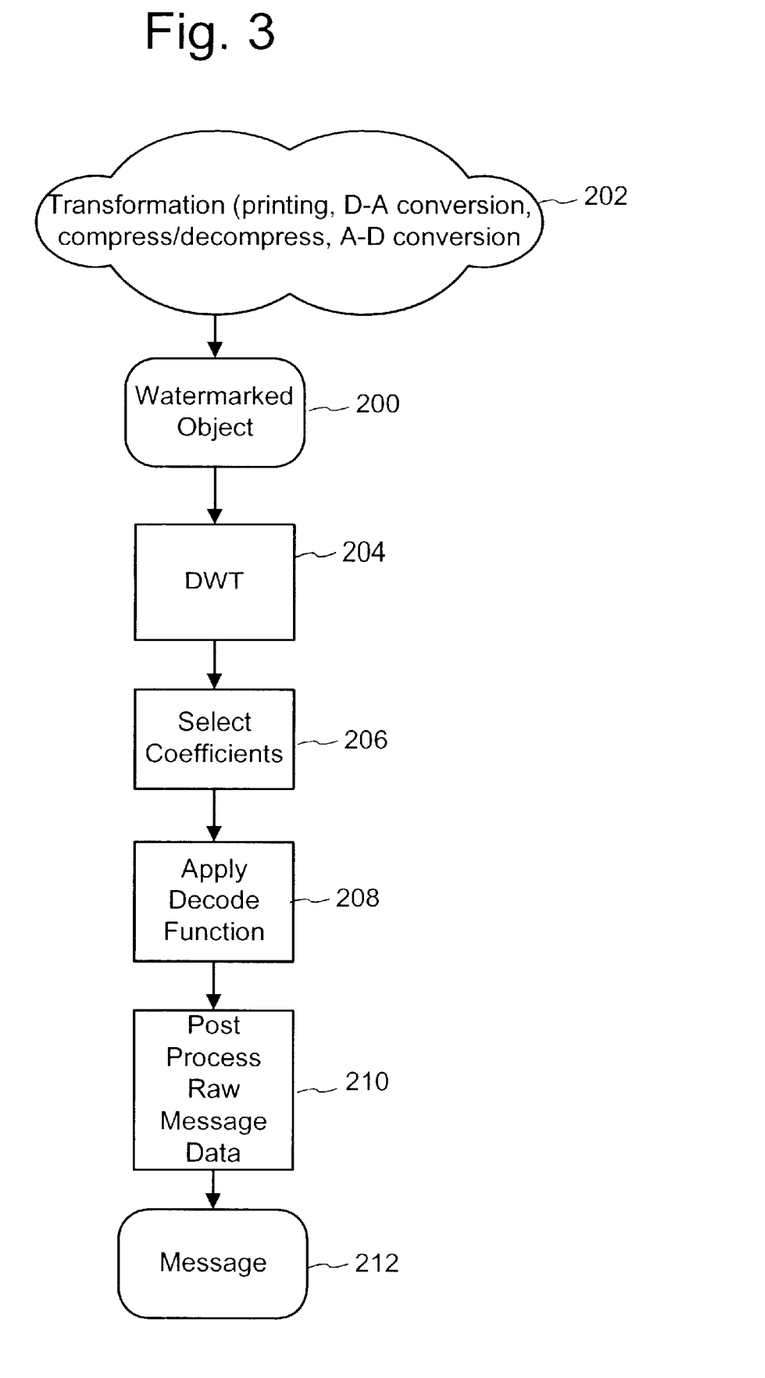
FIG. 3 is a flow diagram illustrating a method for decoding a watermark that is compatible with the encoding method of FIG. 1.

FIG. 3 is a flow diagram illustrating a method for decoding a watermark that is compatible with the encoding method of FIG. 1. As noted above, a watermarked object 200 typically undergoes some form of transformation 202. In some image applications (including still image and video), the watermarked image may remain in the digital domain, yet undergo compression/decompression, scaling, cropping, etc. In other applications, the watermarked image may undergo various phases of printing and scanning. Watermarked audio signals may undergo analogous transformations. For the sake of illustration, this section describes implementation details of a watermark decoder for image watermark applications.

The watermark decoder in this example operates on digital images. Before decoding begins, an imaging system (digital camera, scanner, etc.) captures a digital image of the watermarked object in cases where the watermarked object is in analog form (printed on paper, card, label, packaging or other object). To decode the watermark, the decoder performs a DWT 204 on the digital image. In some implementations, the decoder may apply various pre-processing steps, such as down-sampling or up-sampling the image, converting it to a selected color channel (e.g., luminance), dividing it into blocks, etc. If the watermark encoder selectively embedded a message signal into certain coefficients or subbands, the decoder selects these coefficients or subbands (206).

The decoder then applies a decode function (208) to extract an estimate of the message element encoded in wavelet coefficients. For example, in the embedding function described above, the encoder embedded an element of the message signal in a group of neighboring coefficients. The decoder identifies this group and evaluates the embedding function using the coefficient values in the group. It repeats this process for each group of coefficients to compute an estimate of the binary value of the message element embedded in the group. This decoding process produces a set of raw message data.

As noted in the previous section, the message signal may be the result of various pre-processing operations, such as error correction coding, spread spectrum modulation, adding error detection information, etc. The decoder performs compatible demodulation, error correction decoding, etc. (210) to reconstruct a message (212). It may then output the message or take some other action associated with the message.

Applications

The watermark encoding and decoding methods and systems described above may be employed in a variety of applications. Some applications include counterfeit deterrence, object identification and tracking, usage control (e.g., used to control file transfer, rendering, editing or copying), carrying metadata such as related information or machine instructions, and carrying references or links to information, programs, actions, etc. (linking the object to a network resource such as a web page at a web server).

In these and other applications, the watermark may be designed to be fragile or semi-fragile, or have two or more components, some of which are fragile or semi-fragile, and some that are not. "Fragile" in the context of watermark applications generally refers to an attribute of a watermark in which the watermark degrades in response to certain transformations. For example, if a watermarked image is compressed, cropped or subjected to transformations inherent in certain types image scanning and printing operations, the watermark is degraded or removed. Similarly, in audio watermarks, compression, cropping, digital to analog—analog to digital conversion, etc. may degrade or remove a fragile watermark. The absence of the watermark, or the inability to detect the watermark above certain thresholds, indicates that the watermarked signal has undergone some form of transformation. The decoder may measure the degradation by identifying portion of the signal where a known message cannot be recovered or where a known watermark signal (such as the synchronization or orientation signal) cannot be detected.

In cases where the watermark signal extends across the host signal, the degradation or absence of the watermark can be isolated to specific spatial and or temporal locations within the watermarked signal, and these locations can be tracked and presented to a user as being manipulated subsequent to the watermark encoding process. Examples of ways to embed the watermark signal throughout the host signal is to replicate the watermark in blocks of the host signal or its transform coefficients as noted above.

A semi-fragile watermark has properties that survive certain forms of manipulation, yet does not survive others. One way to implement the semi-fragile watermark is to give the watermark signal attributes that survive certain forms of manipulation and attributes that degrade or do not survive other forms of manipulation. In some implementations, different components of the watermark may degrade differently. By measuring degradation of each component, and then comparing the result, the decoder can evaluate the extent or type of degradation that the watermark signal has undergone. These different components may be separate watermarks that are coextensive or at least partially overlap each other, or embedded in distinct parts of the host signal (e.g., interleaved in different coefficients, bands, resolution levels, temporal or spatial segments, etc.).

Another way to implement the semi-fragile watermark is to embed the watermark robustly to survive expected transformations and include a signal dependent message. This signal dependent message should preferably be insensitive to changes due to the watermarking process, yet should be able to indicate reliably other expected forms of degradation. For example, the message may include a hash of the host signal. The decoder extracts the hash from the watermark message and also re-computes it for the watermarked signal (optionally after re-aligning the signal using the orientation parameters calculated in a watermark detection process). By comparing the decoded hash with the re-computed hash, the decoder can assess whether degradation has occurred and the extent of degradation.

In certain applications, such as where watermarks are placed on physical objects, it is desirable for the watermark to serve multiple functions, such as carrying metadata or a reference to metadata, as well as detect forgery or counterfeiting of the object. In such applications, the watermark needs to carry the metadata robustly to survive printing on the object, soiling or tearing of the object, and then scanning of the degraded object.

The above watermark methods and those in the documents incorporated by reference can be used to carry information in an imperceptible or nearly imperceptible watermark that is robust to common transformations, such as printing, scanning, soiling, tearing, geometric distortion, etc. In addition, these methods may be used to encode and evaluate fragile and semi-fragile watermarks. The remainder of this section describes some example implementations.

One approach for detecting transformation of a watermark signal is to compare parts of the watermark signal decoded in the same or different subbands at a wavelet decomposition level or between levels. Consider an example where a host signal is divided into segments. If the message length M is selected so that the same message may be repeatedly encoded within a level and at different levels, then the watermark decoder can compare the messages decoded from within a given level and at different levels. If the messages decoded from one level are similar within certain tolerances, yet are different from the messages decoded from another level, then the results of the decoding indicate that some alteration has occurred and identify the levels of the decomposition where this alteration has occurred. The decoder may also make comparisons with the original message to assess the extent of the alteration, and the location in the spatial, temporal, or frequency domain where the alteration occurred.

Consider an example where a message of length M is embedded repeatedly in different levels of decomposition in each of several blocks of an image using the embedding function described above. Since the number of coefficients decreases with decreasing level of resolution, the number of messages that may be repeated in each level of decomposition decreases. Nevertheless, the messages decoded from each level can be compared with each other, and with messages of different levels. Assume a 128 by 128 sample image block size, a 48 bit message, and groups of two by two coefficients carrying a single bit of information. The message can be repeated 64 times at level 1, 16 times at level 2, 4 times at level 3, and 1 time at level 4 of the wavelet decomposition. For each level, there is at least one instance of the watermark message $W_{ij}$, where i represents the level of decomposition and j the instance of the watermark message. To check for degradation of the watermark, the decoder compares corresponding instances of the message from different levels, and also compares instances of the message within a given level. If differences in the messages exceed a threshold, the decoder can identify such differences and associate them with known types of transformations that cause such differences.

The decoder may be tuned to detect certain types of alterations based on characterizations of alterations that commonly occur. For example, commercially available printers and scanners may introduce certain types of noise and distortion that can be characterized in terms of their changes to a media signal and the watermark signalembedded in it. Specifically, printers and scanners introduce resampling, aliasing, and/or low pass filtering transformations on the power spectrum of an image. To detect processing by commercial grade scanners and printers, these transformations are characterized in terms of the effect that they have on animage signal and on the watermark signal. These transformations are characterized in a manner that distinguishes them from transformations introduced by a higher quality, forensic grade image scanner.

The watermark decoder then evaluates whether these effects are present in the image and watermark signals derived from a forensic grade scanned image of a watermarked object. The watermark decoder produces evaluation results that indicate whether a watermarked object (document, card, label, etc.) has been copied based on characterization of the transformations that typically occur when objects are copied on common using common reproduction devices, such as copiers, printers, scanners, etc. The watermark decoder can trigger any of a number of actions in response to detecting a form of alteration or degradation that corresponds to acharacterized transformation, such as displaying an indicator of the alteration, indicating where the alteration occurred (e.g., which image block or blocks), displaying the possible types of alteration that occurred (e.g., cropping, commercial grade scanning or printing, etc.), recording a record of the detected alteration (e.g., user and device identifier and address data to covertly trace unauthorized use by user and device), inhibiting use, rendering, or transfer of the watermarked signal, etc.

While the previous example is described in the context of watermarked images on physical objects, similar methods apply to other applications, such as detecting compression of image, video or audio signals based on a characterization of the degradation due to compression on the media signal and the watermark embedded in it. For example, a watermark decoder based on the technology described above detects compression of the watermarked signal by evaluating changes in instances of an embedded message signal at different subbands.

Another way to evaluate alterations to a signal is to encode host signal dependent information into the watermark message. For example, a hash of the host signal may be embedded in the watermark message. To detect alteration of the host signal after watermarking it, a decoder extracts the message and the hash, re-computes the hash for the image, and compares the hash values. If the hash values differ by an amount that exceeds some threshold ranging from zero to some other predetermined amount, then the decoder returns a result indicating that an alteration has occurred. This result may specify the extent of the alteration and the location of the alteration within the watermarked signal.

The hash operation should be insensitive to certain types of alterations, such as those due to the watermark itself. In addition, in applications where the watermark is used on physical objects like documents, the hash should be insensitive to high quality printing that places the watermarked image on the physical object and to forensic scanning used to create a suspect image for evaluation of the watermark.

One method of computing the hash is to compute the hash from watermarked wavelet coefficients in one level of resolution or subband, and then insert the hash as a message in the watermark message embedded in another level of resolution. This can be repeated in two or more bands of the wavelet decomposition. By computing the hash on watermarked coefficients in this manner, the watermark embedding process will not adversely impact the hash value. The decoder evaluates the hash by first watermark decoding it from one band and then recomputing the hash from the coefficients in the band from which it was originally derived. If the hash values differ by more than a threshold, the decoder returns a result indicating that an alteration occurred. Additionally, it can indicate where the alteration was detected (e.g., in which band). If the wavelet based watermark is replicated in blocks or segments of the host signal (e.g., each block or segment is separately wavelet decomposed and watermarked), then the detected alteration can be isolated to the block or segment in which it was detected.

The location of the alteration can then be graphically depicted to the user on the display of a watermark decoder system, such as programmed computer or special purpose forensic analysis tool. For example, a watermarked image can be displayed with altered regions in different colors. The extent of the alteration can be color coded so that more severe alterations are distinguishable from less severe ones.

The watermark embedding function described above counters certain types of attacks because it is dependent on the host media signal. In particular, the embedding function modulates edge feature information represented in the relative values of selected groups of neighboring wavelet coefficients. Since these edge features vary from one signal to another, it is difficult to copy the watermark from one host signal to another.

Concluding Remarks Having described and illustrated the principles of the technology with reference to specific implementations, it will be recognized that the technology can be implemented in many other, different, forms. In addition, it can be used in many different applications, including linking media signals to metadata and actions(e.g., watermark payload that carries a direct or indirect link to information, a device, or program), carrying hidden information secretly and imperceptibly in audio, video or image signals, controlling rendering, use, or transfer of the media signal in which a watermark is embedded, detecting alteration or copying of awatermarked physical or electronic object, etc. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or special purpose digital circuitry. Similarly, auxiliary data decoding may be implemented in software, firmware, hardware, or combinations of software, firmware and hardware.

The methods and processes described above may be implemented in software or firmware programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method for embedding auxiliary information in a media signal such that the auxiliary information is substantially imperceptible, the method comprising:

decomposing the media signal from a perceptual domain to subbands, each subband including a set of coefficients within a frequency range;

embedding a message signal having two or more elements into at least one of the subbands, including:

for each message element, selecting a group of neighboring coefficients in a subband, and modulating edge information in the neighboring coefficients to encode the message element; and after embedding the message signal, inverse transforming the decomposed media signal into the perceptual domain.

2. The method of claim 1 wherein the media signal is an image.

3. The method of claim 1 including:

repeating the decomposing and embedding in segments of the media signal.

4. The method of claim 3 wherein the media signal is an image and the segments are blocks of image samples.

5. The method of claim 1 including:

embedding a watermark orientation signal into the media signal, which enables orientation of the message signal to be computed.

6. The method of claim 1 including:

in a subband at a first level of resolution, selecting N largest coefficients, where N is a predetermined number;

wherein selecting the group of coefficients for a message element includes selecting children coefficients of one of the N largest coefficients in a second higher level of resolution.

7. The method of claim 1 including:

embedding message elements in groups of neighboring coefficients throughout at least one subband.

8. The method of claim 7 including repeatedly embedding the message signal in two or more subbands.

9. The method of claim 1 wherein the message signal is a binary signal and the message elements have binary values.

10. The method of claim 9 wherein the message signal is spread spectrum modulated before embedding.

11. The method of claim 9 wherein the message signal is error correction encoded before embedding.

12. A computer readable medium having software for performing the method of claim 1.

13. A method of decoding a message signal that has been embedded in a media signal such that the message signal is substantially imperceptible in a perceptual domain of the media signal, the method comprising:

decomposing the media signal from a perceptual domain to subbands, each subband including a set of coefficients within a frequency range;

decoding a message signal having two or more elements from at least one of the subbands, including:

for each message element, selecting a group of neighboring coefficients in a subband, and demodulating edge information in the neighboring coefficients to decode the message element.

14. The method of claim 13 wherein the media signal is an image.

15. The method of claim 13 wherein instances of the message signal are embedded in two or more subbands; and including:

decoding each of the instances from the subbands;

comparing the instances with a reference to determine alteration of the media signal.

16. The method of claim 15 wherein the reference comprises an instance decoded from another subband of the media signal.

17. The method of claim 15 wherein a result of the comparison is output to a user to indicate alteration of the media signal.

18. The method of claim 15 wherein the result of the comparison is evaluated relative to a characterization of an alteration to detect a type of alteration.

19. The method of claim 18 wherein the type of alteration comprises compression of the media signal.

20. The method of claim 18 wherein the media signal is an image on a physical object and the type of alteration comprises copying of the physical object.

21. The method of claim 13 wherein the message signal includes a hash of the media signal.

22. The method of claim 21 wherein the hash comprises a hash computed of watermarked coefficients of one subband, and the hash is embedded in coefficients of a different subband.

23. The method of claim 22 including:

extracting the hash from the message signal and comparing it with a hash re-computed from the media signal.

24. A computer readable medium having software for performing the method of claim 13.

25. A watermark embedder for embedding auxiliary information in a media signal such that the auxiliary information is substantially imperceptible, the embedder comprising:

a wavelet transform operator for decomposing the media signal from a perceptual domain to subbands, each subband including a set of coefficients within a frequency range; and a message encoder for embedding a message signal having two or more elements into at least one of the subbands, the embedder operable to modulate edge information in neighboring coefficients of a subband to encode the message elements.

26. The embedder of claim 25 wherein the message elements are embedded by modulating relative differences between neighboring coefficients.

27. A watermark decoder for decoding auxiliary information from a media signal in which the auxiliary information has been embedded so as to be substantially imperceptible in a perceptual domain of the media signal, the decoder comprising:

a wavelet transform operator for decomposing the media signal from a perceptual domain to subbands, each subband including a set of coefficients within a frequency range; and a message decoder for decoding a message signal having two or more elements into at least one of the subbands, the decoder operable to demodulate edge information in neighboring coefficients of a subband to decode the message elements.

28. The decoder of claim 27 wherein the message elements are decoded by a demodulation operator that computes the relative differences between neighboring coefficients and estimating the message elements from the polarity computed by the demodulation operator.

\* \* \* \* \*